Feb. 27, 1934.                L. D. SOUBIER                1,949,380
                              GLASS FURNACE
                            Filed Nov. 5, 1929
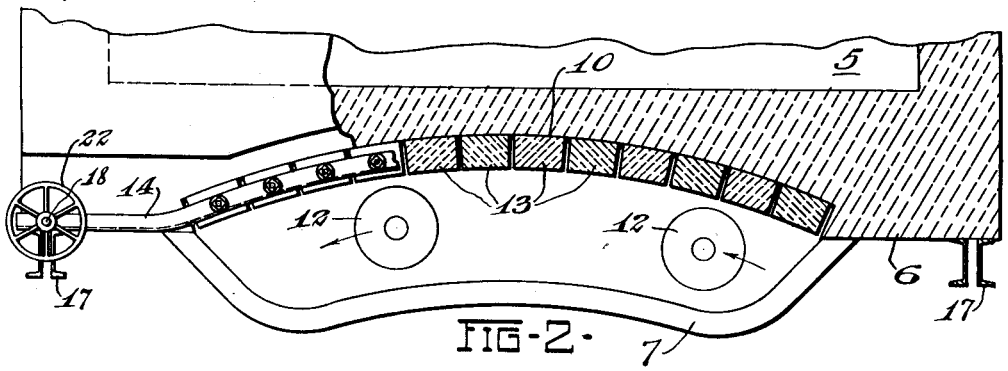
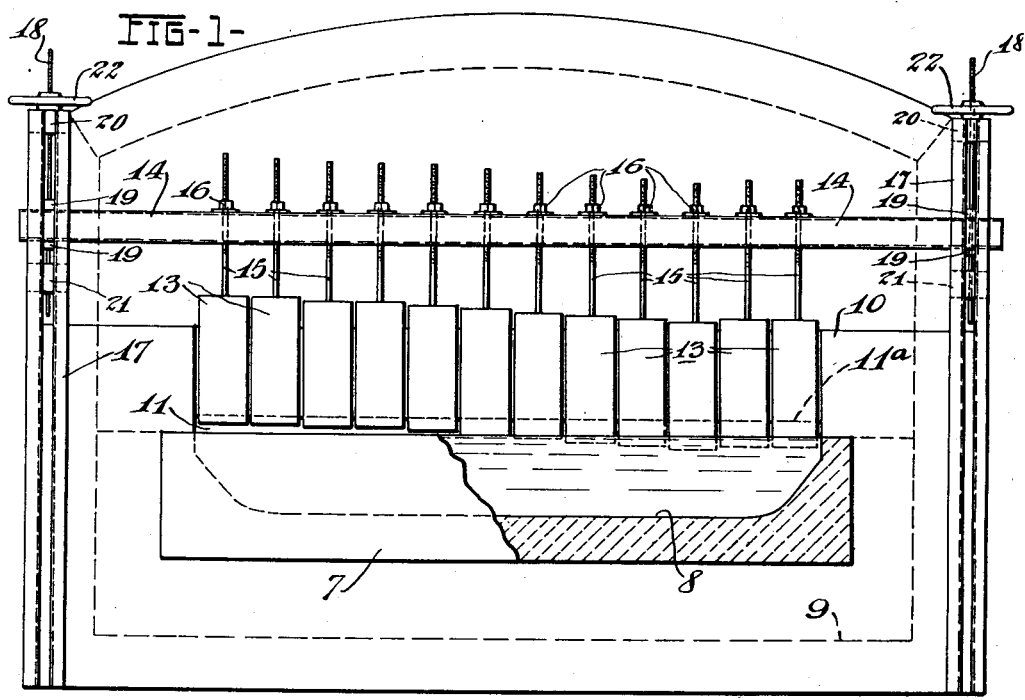
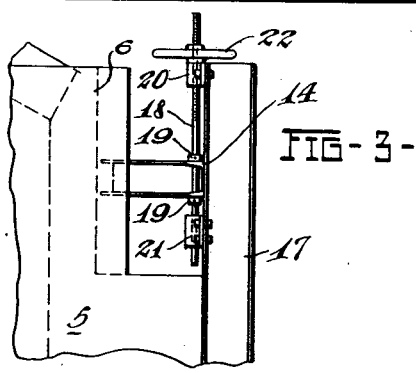
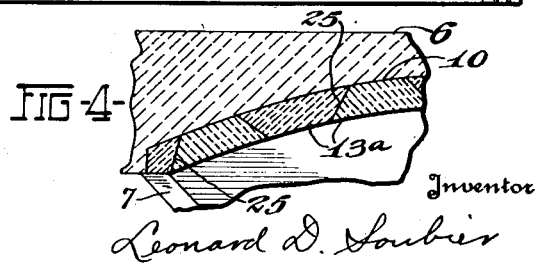
Inventor
Leonard D. Soubier
By J. F. Rule
Attorney Patented Feb. 27, 1934

1,949,380

UNITED STATES PATENT OFFICE 1,949,380

GLASS FURNACE

Leonard D. Soubier, Toledo, Ohio, assignor to Owens-Illinois Glass Company, Toledo, Ohio, a corporation of Ohio Application November 5, 1929. Serial No. 404,885

15 Claims. (Cl. 49—56)

My invention relates to a glass furnace provided with a forehearth or extension through which glass is circulated and from which charges of glass are taken, as by means of suction gathering molds.

In a furnace of the character indicated, it is important to maintain the glass at the gathering area in the forehearth at a uniform temperature suitable for entering the molds, this temperature usually being somewhat lower than the temperature of the glass in the body of the furnace. This requires among other conditions that a constant flow of the glass through the forehearth be maintained for carrying back into the furnace those portions of glass which have been chilled by the molds and by the cutters which sever the glass in the molds from the supply body, the flow of glass also serving to prevent undue cooling or stagnation of the glass in the forehearth.

An object of the present invention is to provide new and improved means for directing and controlling the circulation of glass through the forehearth, and for controlling the temperature conditions.

Other objects of the invention will appear hereinafter.

In the accompanying drawing:

Fig. 1 is a front elevation of a furnace constructed in accordance with my invention, a portion of the forehearth being shown in section.

Fig. 2 is a fragmentary part sectional plan view of the same.

Fig. 3 is a detail sectional side elevation of an upper corner of the furnace, showing means for adjustably mounting the curtain supporting bar.

Fig. 4 is a fragmentary sectional view showing a modified form of blocks forming the auxiliary wall or curtain.

Referring to the drawing, the main furnace 5 comprises a vertical front wall 6 and is provided with a forehearth or extension 7 which may be of usual construction. The floor 8 of the forehearth is at a higher level than the floor 9 of the main tank. The wall 6 of the tank is formed with the usual concave jack-arch 10 beneath which is an opening 11 in the wall, said opening extending substantially the full length of the forehearth 7. The upper edge 11ª of said opening may be horizontal and a substantial distance above the forehearth, the opening extending downward below the normal level of the glass and preferably to the floor of the forehearth. A continuous supply of glass is maintained in the main tank and forehearth at a level just below the upper surface of the forehearth wall.

The furnace is designed for use with glass forming machines of the type comprising an annular series of suction gathering molds 12 mounted on a continuously rotating mold carriage (not shown). The molds may travel from left to right as indicated by the arrow (Fig. 2) and each mold as it is brought over the forehearth dips into the glass and gathers a charge by suction. The travel of the molds through the glass tends to maintain a continuous movement or circulation of glass from the main tank through the forehearth and back into the tank, the glass entering the forehearth near the right hand end thereof and leaving near the opposite end of the forehearth.

In accordance with my invention, there is provided in front of the jack-arch 10 an auxiliary wall or curtain comprising a series of vertically disposed blocks 13 of refractory material. These blocks are arranged side by side and may be in contact with each other or slightly spaced apart to allow for expansion and for freedom of adjustment vertically. The series of blocks extends the full length of the forehearth and covers the greater portion of the opening 11 which is above the level of the glass. The blocks 13 are supported by and depend from a bar 14 which extends across the front of the furnace. This supporting bar as shown is a channel-iron and is curved to conform to the curvature of the jack-arch 10. Each block 13 is carried by a vertical rod or stem 15 rigidly secured thereto, which rod extends upward through openings in the bar 14 and is screw threaded to receive an adjusting nut 16 which seats on said bar. This construction permits each block 13 to be adjusted vertically independently of the other blocks.

The supporting bar 14 is adjustably connected at its ends to the usual angle iron framework 17 of the furnace. The connection at each end of the bar 14 comprises a vertical rod 18 which extends through openings in the bar 14. Collars 19 keyed to the rod 18 above and below the bar 14 prevent relative movement of said bar and rod. The rod 18 extends freely through bearings 20 and 21 secured to the frame 17. The upper portion of the rod 18 is screw threaded to receive an adjusting wheel 22 threaded thereon and seated on the bearing 20. By rotating the hand wheels 22, the supporting bar 14 may be adjusted up or down, thereby vertically adjusting the entire curtain or series of blocks 13.

As shown in Fig. 1, the blocks 13 adjacent the right hand end of the forehearth may be adjusted so that their lower ends extend beneath the surface of the glass. They thus serve as skimmer blocks, causing the glass entering the forehearth to be drawn from beneath the surface of the glass in the main tank. By individual adjustment of the blocks, the path of flow of the glass may be varied and regulated so that the movement of the glass at the gathering area may be controlled to a large extent. Without the use of the blocks 13, there is a tendency for the glass to flow in a comparatively narrow path or channel, the glass in this channel being hot and fluent, while the adjoining glass becomes comparatively cold and stagnant. This results in a lack of uniformity of temperature and homogeneity of the glass entering the molds. By suitable adjustment of the individual blocks 13, this objection may be overcome and a satisfactory distribution of the flowing glass maintained. Moreover, with the blocks adjusted to extend beneath the surface of the glass, they serve as skimmer blocks and cause the glass entering the forehearth to be drawn from beneath the surface of the glass in the main tank at a depth depending on the adjustment of the blocks. This provides not only for obtaining glass free from surface impurities, but also serves as a temperature regulating means, because the temperature of the glass at the gathering area can be regulated to a considerable extent by such adjustment of the blocks and consequent adjustment of the depth at which the glass is drawn from the main tank.

Some of the blocks 13, as shown, are adjusted to a position in which their lower ends are spaced above the glass, thereby allowing a circulation of gases between the main tank and the forehearth and also allowing a free flow of the glass from the forehearth back into the main tank. Ordinarily the burning gases within the main tank are under a pressure slightly above atmospheric pressure, so that there is an outward movement of the flames beneath the blocks 13 and over the surface of the glass in the forehearth. By adjusting the blocks 13 up or down, the volume and path of movement of the flames or gases of combustion over the glass in the forehearth can be regulated, thus adjustably regulating the temperature of the glass at the gathering area.

The general direction in which the glass circulates through the forehearth is determined by the direction in which the molds 12 travel while in dip, but the length of the path of flow may be adjustably controlled and varied through a rather wide range by adjustment of the blocks 13 between the center and the right hand end of the jack-arch. If, for example, the glass at the gathering area becomes too hot, the path of flow through the forehearth may be lengthened by adjusting the block or blocks 13 at or near the right hand end of the forehearth so that they are either out of contact with or extend downwardly only a short distance beneath the surface of the glass, while the blocks nearer the center of the forebay are adjusted to a greater depth. With such an adjustment, the path of movement of the glass will extend through approximately the full length of the forehearth so that the temperature of the glass will be lowered considerably by the time it reaches the gathering point. If, on the other hand, the temperature is too low, the path of movement of the glass in the forehearth may be shortened by lowering the blocks 13 adjacent the ends of the forehearth and raising other blocks which are nearer the center of the jack-arch. The glass is thereby caused to enter and leave the forehearth at points comparatively near the center of the jack-arch, thus shortening the path of movement through the forehearth, so that comparatively little cooling takes place.

Fig. 4 shows a modified form of blocks 13a which form the auxiliary wall or curtain. In this form, the lateral faces 25 of the blocks are beveled or inclined with respect to the front and rear faces, the two lateral faces 25 of each block being divergent or outwardly flared with respect to a front or rear face of the block. The blocks are arranged with their wider faces alternately faced in opposite directions so that the meeting beveled edges or faces 25 of the blocks will abut and lie in the same vertical plane.

This construction provides a practically continuous wall with the meeting faces of the adjacent blocks in contact so as to practically prevent any leakage of the gases between said blocks. With this construction it is also unnecessary to leave clearance between the blocks for expansion, as the alternate blocks are free to move forward the slight distance which may be necessary to accommodate any expansion of the blocks as the temperature rises. Expansion and contraction of the blocks due to variations in temperature can thus take place without separating the meeting faces of the blocks or causing the blocks to bind. Also, any small deviations in the width of any blocks from standard size will not prevent them from making a close fit with adjoining blocks.

Modifications may be resorted to within the spirit and scope of my invention.

What I claim is:

1. In a glass furnace, the combination of a main furnace compartment and a forehearth extension, said furnace comprising a wall having an opening therethrough providing communication between the main furnace and the forehearth, an auxiliary wall or curtain extending downward over and partly closing said opening and comprising a plurality of sections, and means for individually adjusting said sections.

2. In a glass furnace, the combination of a main furnace compartment and a forehearth extension, said furnace comprising a wall having an opening therethrough providing communication between the main furnace and the forehearth, an auxiliary wall or curtain extending over said opening and comprising a plurality of sections, means for individually adjusting said sections, and additional means for adjusting the curtain as a whole and thereby varying the area of said opening covered by the curtain.

3. A glass furnace comprising a vertically disposed wall, a forehearth extending along said wall and projecting forward therefrom, said wall having an opening extending along the forehearth above the normal level of the glass therein, a curtain extending down over said opening, said curtain comprising a plurality of refractory blocks arranged side by side along the opening, and means for individually adjusting said blocks up and down.

4. A glass furnace comprising a vertically disposed wall, a forehearth extending along said wall and projecting forward therefrom, said wall having an opening extending along the forehearth above the normal level of the glass therein, and a curtain extending down over said opening, said curtain comprising a plurality of refractory blocks arranged side by side along the opening, said blocks being individually adjustable vertically into positions in which their lower ends extend below the normal level of the glass in the furnace and of a length to cover said opening when in said adjusted position.

5. A glass furnace comprising a vertically disposed wall, a forehearth extending along said wall and projecting forward therefrom, said wall having an opening extending along the forehearth above the normal level of the glass therein, a curtain extending down over said opening, said curtain comprising a plurality of refractory blocks arranged side by side along the opening, means for individually adjusting said blocks up and down, and means for simultaneously adjusting all of said blocks.

6. A glass furnace comprising a vertically disposed wall, a forehearth extending along said wall and projecting forward therefrom, said wall having an opening extending along the forehearth above the normal level of the glass therein, a curtain extending down over said opening, said curtain comprising a plurality of refractory blocks arranged side by side along the opening, a supporting bar extending along said wall above the curtain, supporting rods connected to and extending upward from said blocks, and adjusting means connecting said rods and supporting bar and permitting individual vertical adjustment of said blocks.

7. A glass furnace comprising, in combination, a front wall, a forehearth extension in front of said wall, said wall formed with an opening above the forehearth and extending lengthwise thereof, a curtain for said opening comprising a multiplicity of blocks arranged side by side along said opening, a horizontal supporting bar extending along said wall above said opening, a framework on which said bar is supported, means for adjusting said bar up and down on the framework, screw threaded rods connected to said blocks and extending upward through openings in said supporting bar, and nuts threaded on said rods above the bar and providing means for individually adjusting said blocks up and down.

8. A glass furnace comprising a vertical wall, a forehearth extension exterior to said wall and into which the glass flows from the main compartment of the furnace, said wall having an opening therein above the forehearth, means for regulating and directing the flow of glass from the main furnace to the forehearth, comprising a plurality of refractory blocks projecting downward into the glass, and means for individually adjusting said blocks up and down.

9. In a glass furnace, the combination of a support, and a furnace wall comprising a series of blocks individually suspended from said support and arranged side by side, the adjoining lateral faces of the blocks being inclined with respect to the front faces, said lateral faces of each block being outwardly flared or inclined with respect to a front or rear face of the block, the meeting lateral faces of each two adjacent blocks being arranged in the same vertical plane and at least one of each two adjoining blocks being free for limited movement horizontally to permit adjustment to compensate for expansion and contraction.

10. A glass furnace comprising a vertical wall, a forehearth extension exterior to said wall, said wall having an opening therethrough above the forehearth, and an auxiliary wall comprising a plurality of refractory blocks arranged side by side over said opening, the lateral faces of said blocks being vertically disposed and inclined with respect to the front and rear faces of said wall.

11. A glass furnace comprising a vertical wall, a forehearth extension exterior to said wall, said wall having an opening therethrough above the forehearth, and an auxiliary wall comprising a plurality of refractory blocks arranged side by side over said opening, the lateral faces of said blocks being vertically disposed and inclined with respect to the front and rear faces of said wall, the two lateral faces of each block being oppositely inclined and the meeting faces of each two adjoining blocks being in the same plane.

12. In a glass furnace, the combination of a support, and a furnace wall comprising a series of vertically disposed blocks suspended from said support and arranged side by side, said blocks having adjoining vertical lateral faces inclined with respect to the front faces, the blocks being free for limited movement horizontally to permit automatic adjustment to compensate for expansion and contraction.

13. In a glass furnace, the combination of a support, a furnace wall comprising a series of vertically disposed blocks suspended from said support and arranged side by side, said blocks having adjoining vertical lateral faces inclined with respect to the front faces, the blocks being free for limited movement horizontally to permit automatic adjustment to compensate for expansion and contraction, and means for individually adjusting said blocks in a vertical direction.

14. In a glass furnace the combination of a main furnace compartment and a forehearth extension, said furnace comprising a wall having an opening therethrough providing communication between the main furnace and the forehearth extension, said forehearth extension having an inlet end and an outlet end, means causing movement of glass through the forehearth extension and said ends, an auxiliary wall extending over said opening and comprising a plurality of sections, the sections projecting below the surface of the glass at the inlet end and spaced above the glass at the outlet end, and means for vertically adjusting said sections whereby the glass may be caused to enter the forehearth extension at different levels.

15. In a glass furnace the combination of a main furnace compartment and a forehearth extension, said furnace comprising a wall having an opening therethrough providing communication between the main furnace and the forehearth extension, said forehearth extension and wall together providing an exposed surface of glass of greater length than width, means causing movement of the glass from the main furnace into one end of and through the forehearth extension and from the other end of the forehearth extension into the main furnace, and an auxiliary wall extending over said opening and comprising a plurality of sections individually adjustable up and down to variably control the level at which glass enters the forehearth and to provide for unobstructed movement of the glass from the forehearth extension to the main furnace.

LEONARD D. SOUBIER.